United States Patent
Moloney et al.

(10) Patent No.: US 10,876,212 B2
(45) Date of Patent: Dec. 29, 2020

(54) CORROSION INHIBITOR COMPOSITIONS AND METHODS OF USING SAME

(71) Applicant: ChampionX USA Inc., Sugar Land, TX (US)

(72) Inventors: Jeremy Moloney, Katy, TX (US); Prakasa Rao Anantaneni, Richmond, TX (US)

(73) Assignee: ChampionX USA Inc., Sugar Land, TX (US)

( * ) Notice: Subject to any disclaimer, the term of this patent is extended or adjusted under 35 U.S.C. 154(b) by 0 days.

(21) Appl. No.: 16/175,051

(22) Filed: Oct. 30, 2018

(65) Prior Publication Data

US 2019/0136388 A1    May 9, 2019

Related U.S. Application Data

(60) Provisional application No. 62/580,107, filed on Nov. 1, 2017.

(51) Int. Cl.
| | |
|---|---|
| C23F 11/167 | (2006.01) |
| C23F 11/14 | (2006.01) |
| C02F 5/00 | (2006.01) |
| C02F 103/36 | (2006.01) |

(52) U.S. Cl.
CPC .......... *C23F 11/1673* (2013.01); *C02F 5/00* (2013.01); *C23F 11/149* (2013.01); *C02F 2103/365* (2013.01); *C02F 2303/08* (2013.01)

(58) Field of Classification Search
None
See application file for complete search history.

(56) References Cited

U.S. PATENT DOCUMENTS

| | | | | |
|---|---|---|---|---|
| 2,477,327 | A | | 7/1949 | Blake |
| 3,077,454 | A | * | 2/1963 | Monroe ................. E21B 41/02 507/244 |
| 3,134,759 | A | | 5/1964 | Kirkpatrick et al. |
| 3,326,919 | A | * | 6/1967 | Wakeman ............ C07D 217/10 546/151 |

(Continued)

FOREIGN PATENT DOCUMENTS

| | | |
|---|---|---|
| CN | 107021890 A | 8/2017 |
| JP | 5934531 A | 2/1984 |

(Continued)

OTHER PUBLICATIONS

Zienty et al., "Base-Catalyzed Addition of Thiols to a,B—Unsaturated Anhydrides", Journal of Organic Chemistry, vol. 27 (9), 1962, pp. 3140-3146.

*Primary Examiner* — Joseph D Anthony
(74) *Attorney, Agent, or Firm* — Kagan Binder, PLLC

(57) ABSTRACT

Disclosed herein are phosphoester anticorrosion compositions comprising an adduct of an alkylphenol ethoxylate phosphate ester with 1,3,5,7-tetraazaadamantane. The adducts are storage stable neat or in a solvent. The adducts are suitably added at about 0.5 ppm to 500 ppm by weight or by volume to a water source comprising one or more corrodents to inhibit corrosion of metal surfaces contacting the water source. The phosphoester anticorrosion compositions are as effective or more effective at inhibiting corrosion than conventional sulfur-based corrosion inhibitors when compared on a weight or volume basis.

16 Claims, 1 Drawing Sheet

(56) References Cited

U.S. PATENT DOCUMENTS

| | | | | |
|---|---|---|---|---|
| 3,422,166 | A | * | 1/1969 | Davis .................. C10M 173/02 |
| | | | | 558/186 |
| 3,650,978 | A | | 3/1972 | Chambers et al. |
| 6,063,334 | A | | 5/2000 | Naraghi |
| 10,000,641 | B2 | | 6/2018 | Miles et al. |
| 10,301,553 | B2 | | 5/2019 | Geissler et al. |
| 10,450,659 | B2 | | 10/2019 | Moloney et al. |
| 10,457,817 | B2 | | 10/2019 | Ekoue-Kovi et al. |
| 10,519,360 | B2 | | 12/2019 | Obeyesekere et al. |
| 10,604,710 | B2 | * | 3/2020 | Moloney ................. C23F 11/04 |
| 10,611,951 | B2 | | 4/2020 | Obeyesekere et al. |
| 2006/0270571 | A1 | * | 11/2006 | Burke .................... A61L 2/186 |
| | | | | 510/130 |
| 2014/0076567 | A1 | | 3/2014 | Meyer et al. |
| 2015/0011453 | A1 | | 1/2015 | Bennett et al. |
| 2016/0177226 | A1 | | 6/2016 | Bennett et al. |
| 2017/0247798 | A1 | * | 8/2017 | Moloney ................. C23F 11/10 |

FOREIGN PATENT DOCUMENTS

| | | |
|---|---|---|
| WO | 01/12878 A1 | 2/2001 |
| WO | 2009/006527 A1 | 1/2009 |
| WO | 2009/097562 A1 | 8/2009 |
| WO | 2016092011 A1 | 6/2016 |

\* cited by examiner

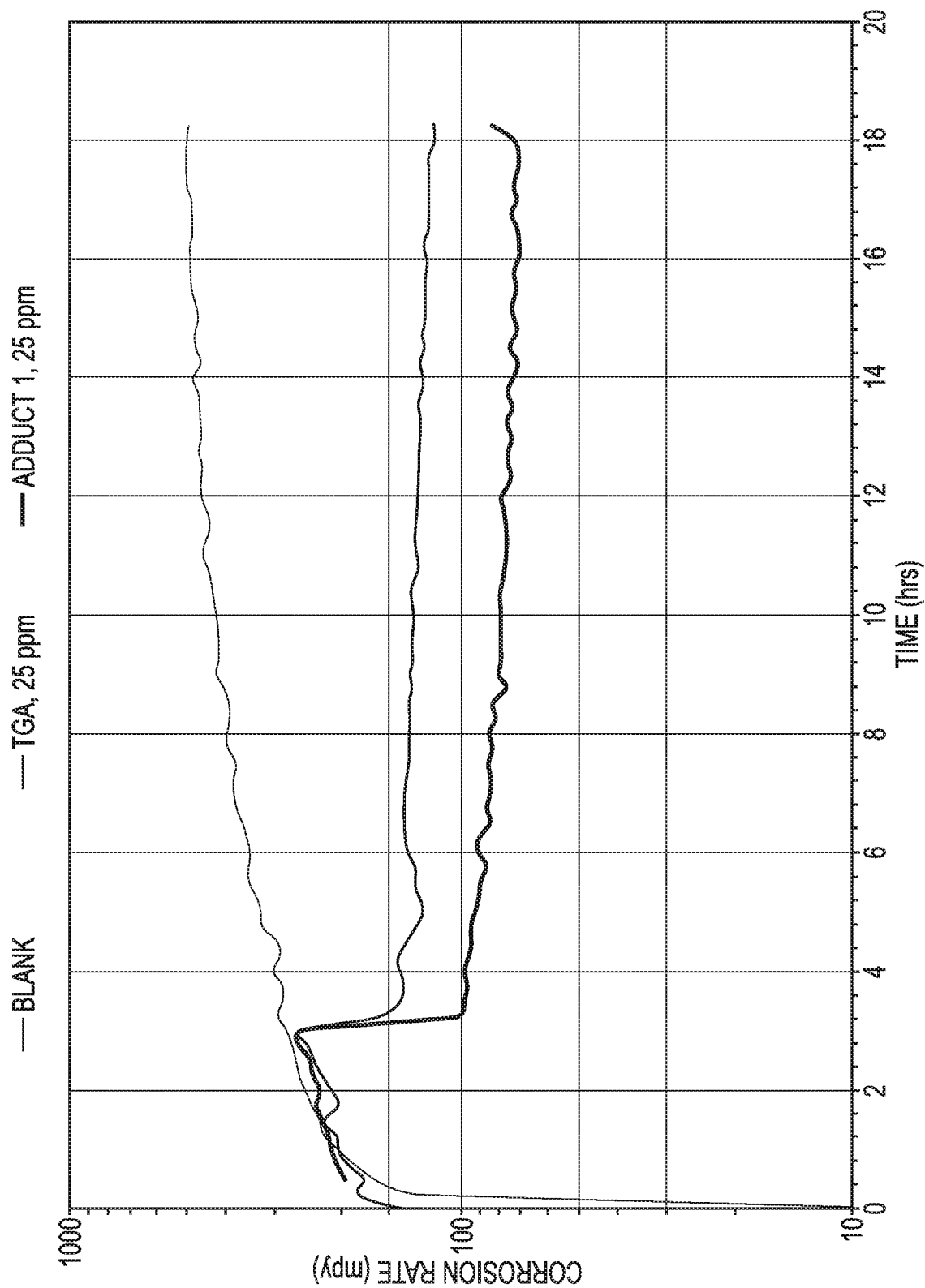

CORROSION INHIBITOR COMPOSITIONS AND METHODS OF USING SAME

FIELD OF THE INVENTION

The present invention generally relates to methods and compositions for improved corrosion inhibition of metal surfaces exposed to one or more corrodents present in water sources.

BACKGROUND

Aqueous liquids are injected into the earth and/or recovered from the earth during subterranean hydrocarbon recovery processes such as hydraulic fracturing (fracking) and tertiary oil recovery. In one or more such processes, an aqueous liquid called an "injectate" is injected into a subterranean formation. Injectates include water and entrained solids and/or solvents therein. In one or more such processes a water source called "produced water" is recovered, i.e. flows back from the subterranean formation and is collected along with a hydrocarbon product. Produced water includes one or more of injectate, connate (native water present in the subterranean formation along with the hydrocarbon), sea water, and hydrocarbon liquids or solids entrained (dispersed, emulsified, or dissolved) therein. In some embodiments, one or more of the injectate and the produced water includes one or more corrodents such as salts and/or other dissolved solids, liquids, or gases that cause, accelerate, or promote corrosion of metal containments such as metal pipelines used to transport the produced water toward, into, out of, or away from a subterranean formation, metal tanks used to hold the water sources for a period of time, and/or other metal equipment or devices that contact the water sources before, during, or after injection or production. Non-limiting examples of such corrodents are carbon dioxide, oxygen, sodium chloride, calcium chloride, and sulfur dioxide.

Almost all operators in the oil and gas extraction and processing industry employ corrosion inhibitors to reduce internal corrosion in metal containments which are contacted by aqueous liquids containing corrodents. Corrosion inhibitors are added to the liquids and dissolved gasses which come into contact with metal surfaces where they act to prevent, retard, delay, reverse, and/or otherwise inhibit the corrosion of metal surfaces such as carbon-steel metal surfaces. In some cases one or more corrosion inhibitors are added to a water source, such as an injectate and/or a produced water; optionally, other additives such as polymers, surfactants, scale inhibitors, paraffin inhibitors, metal complexing agents, and the like are added along with the corrosion inhibitor or are present in the water source to which the corrosion inhibitor is applied. Such corrosion inhibitors are beneficial in that they permit the use of carbon steel components rather than the much more expensive high nickel, cobalt, and chromium alloys or other materials either more expensive than carbon steel and/or which inherently entail other disadvantages in suitability for the purpose of liquid containment.

One useful class of corrosion inhibitors commonly employed in water sources arising from oil recovery processes are sulfur-based corrosion inhibitors. Conventional sulfur-based corrosion inhibitors include, for example, thioglycolic acid, 2-mercaptoethanol, and sodium thiosulfate. Sulfur-based corrosion inhibitors are known to be highly effective corrosion inhibitors and are favored in the industry because they are also inexpensive. However, some sulfur-based corrosion inhibitors are known to produce hydrogen sulfide ($H_2S$) gas when stored in an enclosed space for periods of time as short as 24 hours or even less at ambient temperatures such as about 20° C. This problem is exacerbated by storage of sulfur-based corrosion inhibitor concentrates, which may include up to 90 wt % of one or more sulfur-based corrosion inhibitors in a solution or dispersion. Conventional storage methods employed for these concentrates lead to substantial amounts of $H_2S$ gas buildup in the headspace of the containers holding such concentrates: in some embodiments, as much as 1000 ppm to 10,000 ppm $H_2S$ gas accumulates in the headspace of storage containers holding a sulfur-based corrosion inhibitor concentrate.

Hydrogen sulfide is toxic and dissolves in both hydrocarbon (oil/gasoline) and water streams. Hydrogen sulfide is also a common corrodent in oil recovery systems, recognized to cause severe corrosion issues in metal containments employed in oil recovery operations. Further, where $H_2S$ is dissolved in such liquid streams it is also present as a flammable gas over the liquid streams, adding to the hazards of oil recovery.

Consequently, there is a need in the oil recovery industry for corrosion inhibitor compositions that exclude sulfur. And there is a need in the industry to improve the corrosion inhibition efficacy of anti-corrosion treatments beyond that of industry-standard sulfur-based corrosion inhibitor compositions, in particular where the corrodents include or are substantially hydrogen sulfide.

BRIEF DESCRIPTION OF THE DRAWINGS

The FIGURE is a plot of corrosion in milli-inches per year as a function of time for a composition described herein.

SUMMARY OF THE INVENTION

Disclosed herein are phosphoester anticorrosion compositions including, consisting essentially of, or consisting of an adduct of an alkylphenol ethoxylate phosphate ester (hereinafter "APEP") with hexamethylenetetramine (hereinafter "HMTA"; 1,3,5,7-tetraazaadamantane). HMTA has the structure:

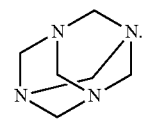

The APEP includes, consists essentially of, or consists of one or more structures corresponding to formula I, formula II, or a combination thereof.

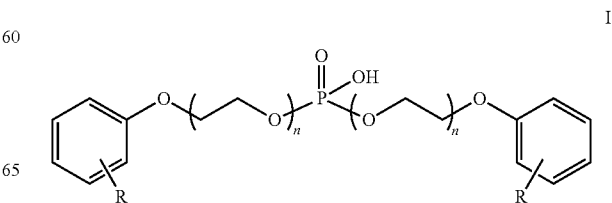

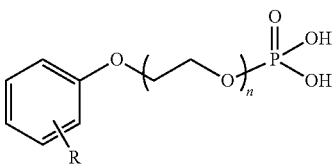

II wherein each n is independently an integer having a value of between 3 and 30, and each R is independently a linear or branched C6-C20 alkyl group.

In embodiments a phosphoester anticorrosion composition comprises or consists essentially of one or more adducts of HMTA with the APEP having formula I, further wherein the APEP of formula II is excluded or substantially excluded. In such embodiments, the phosphoester anticorrosion compositions comprise or consist essentially of a 2:1 molar adduct of HMTA with the APEP of formula I, a 1:1 molar adduct of HMTA with the APEP of formula I, or an intermediate composition including a blend of adducts having an average of between 1 and 2 moles of HMTA per mole of the APEP of formula I.

In other embodiments the phosphoester anticorrosion composition comprises or consists essentially of one or more adducts of HMTA with the APEP having formula II, further wherein the APEP of formula I is excluded or substantially excluded. Such phosphoester anticorrosion compositions comprise or consist essentially of a 1:1 molar adduct of HMTA with the APEP of formula II. In embodiments, the phosphoester anticorrosion composition comprises or consists essentially of one or more 2:1 adducts of HMTA with the APEP of formula I, one or more 1:1 adducts of HMTA with the APEP of formula I, one or more 1:1 adducts of HMTA with the APEP of formula II, or a mixture of two or more thereof.

The phosphoester anticorrosion compositions are formed by the reaction of one or two moles of HMTA with an APEP. In embodiments, the compositions are formed by simply blending and heating the HMTA and the one or more APEP neat, that is, without solvent. In other embodiments a solvent is employed in the reaction to form the phosphoester anticorrosion compositions. The HMTA and APEP are heated to a temperature of at least about 80° C. and as high as 200° C. to cause adduct formation.

Also disclosed herein are phosphoester anticorrosion concentrates. Phosphoester anticorrosion concentrates comprise about 1 wt % to 90 wt % of one or more phosphoester anticorrosion compositions and at least one solvent. In embodiments the solvent comprises, consists essentially of, or consists of water, one or more $C_1$-$C_6$ alkanols, one or more alkoxyalkanols, one or more glycols, one or more glycol ethers, one or more glycol esters, and mixtures of two or more such solvents in any ratio. In some embodiments the one or more solvents are the balance of the concentrate, that is, 10 wt % to 99 wt % of the concentrate. Optionally, the concentrate further includes one or more polymers, surfactants, or combinations of two or more thereof. In some embodiments the phosphoester anticorrosion concentrates are emulsions. In some embodiments the phosphoester anticorrosion concentrates include about 5 wt % to 25 wt % of one or more phosphoester anticorrosion compositions. The phosphoester anticorrosion compositions and the phosphoester anticorrosion concentrates are stable under standard storage conditions for at least one day and up to five years.

In embodiments, about 0.5 ppm to 500 ppm of one or more phosphoester anticorrosion compositions, based on either weight or volume, are applied to a water source comprising a corrodent to form a treated water source. The treated water source is contacted with a surface of a metal containment, wherein corrosion of the metal surface by the one or more corrodents is inhibited. The phosphoester anticorrosion compositions inhibit corrosion of metal containments contacted with one or more water sources wherein the one or more water sources comprise one or more corrodents. In embodiments, when compared on a weight basis, the phosphoester anticorrosion compositions are as effective, or more effective, than conventional sulfur-based corrosion inhibitors at inhibiting corrosion of metal surfaces contacted with a water source.

Thus, also disclosed herein is a method of treating a water source comprising one or more corrodents, the method comprising or consisting essentially of applying about 0.5 ppm to 500 ppm by weight of one or more phosphoester anticorrosion compositions to the water source to form a treated water source. Also disclosed herein is a method of treating a metal containment, the method comprising or consisting essentially of forming a treated water source; and applying the treated water source to a metal containment. The metal containment is a tank, pipe, or other apparatus having a metal surface in contact with a water source, wherein the water source includes one or more corrodents. In embodiments the one or more corrodents include one or more of hydrogen sulfide, carbon dioxide, oxygen, sodium chloride, calcium chloride, and sulfur dioxide. In embodiments the method includes forming a phosphoester anticorrosion concentrate, then combining the concentrate with the water source.

Also disclosed herein are treated water sources and treated metal containments including one or more phosphoester anticorrosion compositions. A treated containment is a metal containment comprising a treated water source contacting a metal surface or portion thereof. A treated water source comprises water, one or more corrodents, and about 0.5 ppm to 500 ppm of one or more phosphoester anticorrosion compositions. In embodiments, the water source is an industrial water source, such as a produced water or waste water from an industrial process. In embodiments the one or more corrodents include $H_2S$. In embodiments, the containment surface in contact with the water source or the treated water source includes a carbon steel surface. In embodiments, the carbon steel surface is a stainless steel surface. In embodiments, the water source is a continuously flowing water source, such as produced water flowing from a subterranean reservoir and into or through a pipe or tank, or wastewater isolated from a continuous manufacturing process flowing into a wastewater treatment apparatus. In other embodiments, the water source is a batch, or plug, substantially disposed in a batchwise or static state within the containment.

DETAILED DESCRIPTION

Although the present disclosure provides references to preferred embodiments, persons skilled in the art will recognize that changes may be made in form and detail without departing from the spirit and scope of the invention. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used herein, the term "water source" means a liquid comprising water and one or more corrodents. In embodiments, the water source comprises, consists essentially of, or consists of wastewater from one or more industrial processes. In embodiments, the water source comprises, consists essentially of, or consists of produced water. In embodiments, the amount of the one or more corrodents in the water source is sufficient to corrode a carbon steel at a rate of at least 100 milli-inches per year, and in embodiments as much as 1000 milli-inches per year.

As used herein, the term "produced water" means a water source that flows from a subterranean formation in a hydrocarbon recovery process such as hydraulic fracturing or tertiary oil recovery, further wherein the water source includes one or more hydrocarbons, one or more dissolved solids, or a combination thereof.

As used herein, the term "corrodent" means salts and/or other dissolved solids, liquids, or gasses that cause, accelerate, or promote corrosion, further wherein the corrodent is dissolved or dispersed in a water source. Non-limiting examples of corrodents are hydrogen sulfide, hydrogen chloride, carbon dioxide, oxygen, sodium chloride, calcium chloride, and/or sulfur dioxide.

As used herein, the term "container" means a discrete article having an interior volume and means to enclose a liquid therein, wherein "enclose" means substantially isolate the liquid from the ambient atmosphere and from fluid communication. Means to enclose include one or more of caps, valves, lids, covers, plugs, stoppers, doors, or other conventional means known to those of skill to enable enclosing a liquid within the interior volume. In embodiments, the interior volume of the container enclosing a liquid further includes a headspace volume comprising a gas.

As used herein, the term "storage conditions" generally refers to the conditions surrounding or proximal to a container and that affect the temperature and/or pressure of the enclosed contents of the container. Such conditions include ambient temperature and pressure, contact of the exterior container with direct sunlight, and the like. In embodiments the storage conditions cause temperature and pressure within the container to vary during a storage period, wherein the storage period is 24 hours to five years.

As used herein, the term "standard storage conditions" means storage conditions wherein the temperature proximal to the container or within the container is between −40° C. and 70° C.

As used herein, the term "stable" means no measurable chemical changes.

As used herein, the term "containment" or "metal containment" means an apparatus having a metal surface or portion thereof that is in contact with a water source, or potentially in contact with a water source, or intended for contact with a water source. In embodiments the containment is in fluid communication with one or more devices or apparatuses, including other containments. In embodiments the containment is a pipe. In embodiments the containment is a tank. In embodiments, the metal is steel. In embodiments, the steel is carbon steel. In embodiments, the carbon steel is stainless steel.

The terms "comprise(s)", "include(s)", "having", "has", "can", "contain(s)", and variants thereof, as used herein, are intended to be open-ended transitional phrases, terms, or words that do not preclude the possibility of additional acts or structures. The singular forms "a", "and", and "the" include plural references unless the context clearly dictates otherwise. The present disclosure also contemplates other embodiments "comprising", "consisting of" and "consisting essentially of", the embodiments or elements presented herein, whether explicitly set forth or not.

As used herein, the term "optional" or "optionally" means that the subsequently described component, event or circumstance may but need not be present or occur. The description therefore discloses and includes instances in which the event or circumstance occurs and instances in which it does not, or instances in which the described component is present and instances in which it is not.

As used herein, the term "about" modifying, for example, the quantity of an ingredient in a composition, concentration, volume, temperature, time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, through standard operating machine error, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents according to this definition. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with a value or property, or some other amount as provided in context. A composition that has "substantially only" attached to a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

Discussion

Disclosed herein are phosphoester anticorrosion compositions including one or more adducts of alkylphenol ethoxylate phosphate esters (hereinafter "APEP") with hexamethylenetetramine (hereinafter "HMTA"; 1,3,5,7-tetraazaadamantane). The APEP includes, consists essentially of, or consists of one or more structures corresponding to formula I, formula II, or a combination thereof,

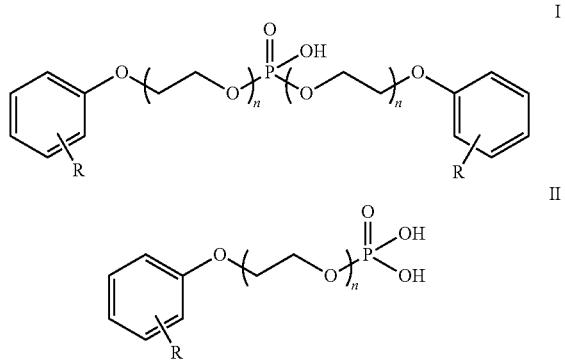

wherein each n is independently an integer having a value of between 3 and 30, and each R is independently a residue of alkyl group.

The APEP having formula I may be referred to herein as APEP I. The APEP having formula II may be referred to herein as APEP II. An APEP includes, consists essentially of, or consists of an alkylphenol ethoxylate diester of phosphoric acid (APEP I), an alkylphenol ethoxylate monoester of phosphoric acid (APEP II), or a mixture thereof.

In embodiments, the APEP each include one or more aromatic moieties having an alkyl group positioned at one of the 5 aromatic carbon atoms not bonded to oxygen. In embodiments, the alkyl group R is an n-alkyl group; in other embodiments the alkyl group is branched, such as an iso-alkyl or tert-alkyl. In embodiments, an alkyl group R consists of carbon and hydrogen. In embodiments, all R consist of carbon and hydrogen. In embodiments, the alkyl group has at least 6 and as many as 20 carbon atoms, for example 7 to 16 carbons, 8 to 14 carbons, or 9 to 12 carbons. The alkyl group is linear or branched. The alkyl group is situated ortho, para, or meta with relation to the aromatic oxygen atom. In embodiments, an R group is n-nonyl or iso-nonyl. In embodiments, all R groups are n-nonyl or iso-nonyl.

In embodiments, the value of n (number of ethoxylate repeat units) ranges independently from about 4 to 20, for example 5 to 20, 7 to 20, 9 to 20, 4 to 15, 4 to 10, 6 to 10, or 8 to 10. Averages of these numbers are often used to express an "ethoxylate number" in e.g. nonionic surfactants such as alkylphenol ethoxylates. Such averages are obtained by measuring hydroxyl content, in some embodiments as is familiar to the skilled artisan.

The APEP are formed by methods well known to the skilled artisan, such as by reacting one mole of $P_2O_5$ with one mole or two moles of the corresponding alkylphenol ethoxylate, in embodiments employing a molar excess of the alkylphenol ethoxylate. In embodiments where a molar excess is employed, the excess alkylphenol ethoxylate is removed after completion of the reaction and during purification of the phosphate ester product using methods well known to those of skill.

While not being limited by any particular theory, we believe that the phosphoester anticorrosion compositions are ionic compounds. The ionic compounds may include least one HMTA ammonium cation ionically paired with a phosphate anion, wherein the ionic adduct is formed by heating the HMTA in the presence of APEP I or APEP II. Alternatively, in some embodiments the heat supplied to the HMTA causes the HMTA to degrade into ammonia and formaldehyde and/or one or more related degradation products based on reactions of ammonia and formaldehyde, and these degradation products then react with APEP I, APEP II, or a combination thereof to provide a phosphoester anticorrosion composition.

Phosphoester anticorrosion compositions based on the reaction of HMTA with APEP I, and excluding or substantially excluding APEP II as a starting material are referred to herein as Adduct I. In embodiments Adduct I comprises or consists essentially of one or more adducts of HMTA with the APEP I. In some such embodiments, Adduct II is excluded or substantially excluded. Phosphoester anticorrosion compositions based on the reaction of HMTA with APEP II, and excluding or substantially excluding APEP I as a starting material are referred to herein as Adduct II. In embodiments Adduct II comprises or consists essentially of one or more adducts of HMTA with the APEP II. In some such embodiments, Adduct I is excluded or substantially excluded.

In embodiments Adduct I comprises or consists essentially of one or more adducts of HMTA with the APEP I. In some such embodiments, APEP II is excluded or substantially excluded. In such embodiments, Adduct I comprises or consists essentially of one or more 1:1 molar adducts of HMTA with APEP I, further wherein Adduct II is excluded or substantially excluded. Such phosphoester anticorrosion compositions comprise or consists essentially of a 1:1 molar adduct of HMTA with an APEP I. In some embodiments Adduct I further includes one or unreacted HMTA or APEP I compounds, further wherein a molar ratio of HMTA to APEP I is between 0.5:1 to 1:1. In such embodiments, Adduct I is an intermediate composition having a range of compounds reflecting between 0 and 1 molar equivalents HMTA per mole of APEP I. Such averages are formed by the skilled artisan selecting certain reaction conditions to form Adduct I, such as a particular molar ratio of HMTA to APEP I, a particular APEP I structure, a particular reaction temperature, a particular contact time of the HMTA with APEP I, or a combination of two or more of these.

In embodiments Adduct II comprises or consists essentially of one or more adducts of HMTA with the APEP II. In some such embodiments, APEP of formula I is excluded or substantially excluded. In such embodiments, Adduct II comprises or consists essentially of a 2:1 molar adduct of HMTA with the APEP II, a 1:1 molar adduct of HMTA with the APEP of formula II, or an intermediate composition including a blend of adducts having an average of between 1 and 2 moles of HMTA per mole of the APEP II. An intermediate composition includes a blend of phosphoester anticorrosion compositions wherein the number average, weight average, or median molecular weight is representative of adducts of HMTA with the APEP having formula II, further wherein a molar ratio of HMTA to APEP II is between 1:1 and 2:1, such as 1:1 to 1.9:1, 1:1 to 1.8:1, 1:1 to 1.7:1, 1:1 to 1.6:1, 1:1 to 1.5:1, 1:1 to 1.4:1, 1:1 to 1.3:1, 1:1 to 1.2:1, or 1:1 to 1.1:1, or any individual average measured for a particular batch of phosphoester anticorrosion composition, such as 1:1, 1.1:1, 1.2:1, 1.3:1, 1.4:1, 1.5:1, 1.6:1, 1.7:1, 1.8:1, 1.9:1, or 2:1. Such averages are formed by the skilled artisan selecting certain reaction conditions to form Adduct II, such as a particular molar ratio of HMTA to APEP II, a particular APEP II structure, a particular reaction temperature, a particular contact time of the HMTA with APEP II, or a combination of two or more of these.

In embodiments, the phosphoester anticorrosion composition comprises or consists essentially of one or more 1:1 adducts of HMTA with APEP I, one or more 1:1 adducts of HMTA with APEP II, one or more 2:1 adducts of HMTA with APEP II, or a mixture of two or more thereof. In embodiments, such averages/intermediate compositions are also formed by the skilled artisan selecting a desired molar ratio of HMTA to P, or molar ratio of HMTA to alkylphenol ethoxylate, and blending two more phosphoester anticorrosion compositions after synthesis thereof to target the desired ratio of HMTA to P, HMTA to alkylphenol ethoxylate, Adduct I to Adduct II, or some other desirable blend to obtain a particular anticorrosion result.

The phosphoester anticorrosion compositions are formed by contacting one or two moles of HMTA with an APEP, and heating the contacted components. In embodiments, the compositions are formed by simply blending and heating HMTA and one or more APEP neat, that is, without solvent. In other embodiments a solvent is employed in the reaction to form the phosphoester anticorrosion compositions. The contacting is continued until the reaction is substantially complete. In embodiments the contacted components are heated. In some embodiments the combination of contacted components further includes one or more solvents. However, it is an advantage of the present method that no solvent is required to conduct the reaction and the reaction may be completed "neat", that is, substantially excluding solvents or excluding solvents. Suitable solvents that are optionally included in the reaction mixture to form a phosphoester anticorrosion composition include water, $C_1$-$C_6$ alkanols, alkoxyalkanols, glycols, glycol ethers, glycol esters and mixtures of two or more such solvents in any ratio.

In embodiments, the heating is heating to a temperature sufficient to melt one or more of the contacted components. In embodiments, the heating is heating to a temperature of about 80° C. to 200° C., or about 100° C. to 150° C., or about 100° C. to 120° C., or about 80° C. to 120° C., or about 80° C. to 100° C. In some embodiments, the heating is continued for a period of about 1 minute to about 12 hours, or about 10 minutes to 10 hours, or about 30 minutes to 5 hours. In embodiments the heating is continued until one or more of Adduct I and/or Adduct II are detected, or until the reaction between the components is sufficient to provide optimal anti-corrosion activity of the resulting Adduct, as determined by the operator and further by optimization of reaction products for one or more specific containments, specific corrodents, specific water sources, or a combination thereof.

Detecting the extent of the reaction and/or verifying the formation of a phosphoester anticorrosion composition is easily accomplished using one or more common analytical methods known to those of skill. Representative but non-limiting examples of such methods include liquid chromatography, gas chromatography, and thin layer chromatography. Such techniques are readily employed in monitoring a reaction to form one or more of Adduct I, Adduct II, or combinations of such compounds as described herein. It is a feature of the invention that the mixture components are easily blended and the reaction between the contacted components is easily monitored using conventional methods.

In embodiments, after the reaction is complete, the phosphoester anticorrosion compositions are employed without further purification by applying the reaction product formed by contacting HMTA with APEP I, APEP II, or a combination thereof to one or more water sources to form a treated water source, and applying the treated water source to a metal containment. However, purification of phosphoester anticorrosion compositions may be employed to remove solvent and/or unreacted components prior to applying the composition to a water source.

The phosphoester anticorrosion compositions are suitably stored neat, that is, substantially at 100% solids and without solvent or any other additives. When stored neat, the phosphoester anticorrosion compositions are storage stable for about one year, or about one year to five years, or about one year to ten years. However, to facilitate rapid mixing of the phosphoester anticorrosion compositions with a water source and further to facilitate pouring, pumping, or other manipulation of the phosphoester anticorrosion compositions as required to deliver them to a water source in need of corrosion inhibition, in embodiments the phosphoester anticorrosion compositions are formulated and optionally stored as concentrates. The phosphoester anticorrosion concentrates are suitably stored in standard storage conditions, followed by applying or adding the concentrate, often by pumping or pouring, to a water source comprising one or more corrodents.

Thus, in embodiments, the phosphoester anticorrosion compositions are phosphoester anticorrosion concentrates. A phosphoester anticorrosion concentrate comprises or consists essentially of about 1 wt % to 90 wt % of one or more phosphoester anticorrosion compositions, and one or more solvents. In embodiments, the balance of the weight of the concentrate is the solvent. In embodiments the concentrates include about 99 wt % to 10 wt % solvent. Suitable solvents include water, $C_1$-$C_6$ alkanols, alkoxyalkanols, glycols, glycol ethers, glycol esters and mixtures of two or more such solvents in any ratio. Additionally a suitable concentrate is formed by employing water as the solvent and further including a non-ionic surfactant in the water, wherein the concentrate is an emulsion. The phosphoester anticorrosion concentrates comprise or consist essentially of at least about 1 wt % and up to about 90 wt % of one or more Adduct I, one or more Adduct II, or a combination thereof, for example about 1 wt % to 80 wt %, or about 1 wt % to 70 wt %, or about 1 wt % to 60 wt %, or about 1 wt % to 50 wt %, or about 1 wt % to 40 wt %, or about 1 wt % to 30 wt %, or about 1 wt % to 20 wt %, or about 1 wt % to 10 wt %, or about 3 wt % to 90 wt %, or about 5 wt % to 90 wt %, or about 10 wt % to 90 wt %, or about 15 wt % to 90 wt %, or about 20 wt % to 90 wt %, or about 25 wt % to 90 wt %, or about 30 wt % to 90 wt %, or about 3 wt % to 30 wt %, or about 3 wt % to 20 wt %, or about 5 wt % to 25 wt %, or about 5 wt % to 15 wt % total phosphoester anticorrosion composition content by weight of the concentrate. In embodiments the one or more solvents are the balance of the concentrate, that is, 10 wt % to 99 wt % of the concentrate. The phosphoester anticorrosion concentrates are characterized as being liquid, or substantially liquid, at 20° C. In embodiments, the phosphoester anticorrosion concentrates are characterized as being liquid, or substantially liquid, between 0° C. and 100° C. The phosphoester anticorrosion concentrates are characterized as stable when stored in a container for a period of 24 hours to 5 years under standard storage conditions.

Solvents useful in forming and storing the phosphoester anticorrosion concentrates under standard storage conditions are compounds that do not react with phosphate esters or adducts thereof to form any covalent bonds, and are themselves substantially liquid at temperatures at least in the range of 0° C. to 100° C. at atmospheric pressure. Solvents usefully employed in the phosphoester anticorrosion concentrates include water, $C_1$-$C_6$ alkanols, alkoxyalkanols, glycols, glycol ethers, glycol esters and mixtures of two or more such solvents in any ratio. In some embodiments, the reaction to form a phosphoester anticorrosion composition is facilitated by addition of one or more solvents, wherein the reaction product after contacting the components, and optionally after further heating the contacted components, is a phosphoester anticorrosion concentrate. In some embodiments a phosphoester anticorrosion concentrate is suitably applied to, added to, or contacted with a water source comprising one or more corrodents.

The phosphoester anticorrosion concentrates are suitably stored within enclosed containers at temperatures of about −60° C. to 100° C., such as about −50° C. to 80° C., or about −40° C. to 70° C., or about −20° C. to 50° C., or about −10° C. to 50° C. for a storage period of about 1 day (24 hours) to 10 years, for example about 1 day to 5 years, or about 1 day to 2 years, or about 1 week to 10 years, or about 1 month to 10 years, or about 6 months to 10 years, or about 1 year to 10 years. During the storage, no special steps or treatments are required to stabilize or mitigate degradation within the phosphoester anticorrosion concentrates.

In some embodiments, a phosphoester anticorrosion composition, such as a phosphoester anticorrosion concentrate, further includes one or more additives. In embodiments the additives are one or more polymers, one or more surfactants, or combinations of two or more of these. In embodiments, the additives are added to the phosphoester anticorrosion composition to provide a benefit to a water source, a treated metal containment, or both. Non-limiting examples of such benefits include stabilization against phase separation; pH adjustment; and ease and completeness of mixing when the phosphoester anticorrosion concentrate is combined with the water source.

Suitable additives include alicyclic, aromatic, or aralkyl amines having 6 to 30 carbons, and including e.g. triazine, pyridine and substituted pyridines; aliphatic and alicyclic amides; imidazoline; quaternary ammonium surfactants having an HLB greater than about 9; phosphate esters such as $C_2$-$C_{16}$ or $C_8$-$C_{10}$ alkyl phosphate esters including e.g. di-2-ethylhexyl phosphate (di-2-ethylhexyl phosphoric acid), dialkylphosphate, didecylphosphate, mixed phosphate esters, and the like, ethoxylated $C_1$-$C_{12}$ or $C_8$-$C_{10}$ alkylphenol phosphate esters, or other organophosphate esters having a total of 2 to 30 carbons; quinoline, salts thereof, and quaternized derivatives thereof with $C_1$-$C_{30}$ alkyl halides; water soluble polymers such as polyethylene oxide and copolymers thereof; derivatives of carboxylic acids having 6 to 30 carbons, such as salts or alkanol esters of $C_1$-$C_{30}$ organic acids; and mono- or polyunsaturated long-chain acids derived from sources comprising, consisting essentially of, or consisting of TOFA, coconut oil, canola oil, palm seed oil, and the like obtained as a by-product of the Kraft process of wood pulp manufacture, principally from pulping coniferous trees. Blends of two or more of the foregoing additives are also suitably employed in the phosphoester anticorrosion concentrates.

Each additive and amount of the additive is selected individually by a user for addition to the phosphoester anticorrosion composition; the amounts of such additives are not particularly limited. However, in embodiments, a selected additive is present in an amount of 10 wt % or less based on the weight of phosphoester anticorrosion composition. For example, in embodiments, an additive is present in the phosphoester anticorrosion concentrate in an amount of about 10 wt % to 0.0001 wt % based on the total weight of phosphoester anticorrosion composition, or about 10 wt % to 0.001 wt %, or about 10 wt % to 0.01 wt %, or about 10 wt % to 0.1 wt %, or about 10 wt % to 1 wt %, or about 0.001 wt % to 5 wt %, or about 0.001 wt % to 4 wt %, or about 0.001 wt % to 3 wt %, or about 0.001 wt % to 2 wt %, or about 0.001 wt % to 1 wt % based on the total weight of phosphoester anticorrosion composition present in the phosphoester anticorrosion concentrate. The amount of additive is selected by the user to obtain optimized storage stability of the phosphoester anticorrosion concentrate, optimized mixing of the phosphoester anticorrosion concentrate with a water source, optimized performance of the phosphoester anticorrosion composition in terms of corrosion inhibition, mixing, stability, or another factor or combination of two or more such factors.

In embodiments, the container employed to store the phosphoester anticorrosion concentrate is a discrete article having an interior volume and means to enclose a liquid therein, wherein "enclose" means substantially isolate the liquid from the ambient atmosphere and from fluid communication. In embodiments, the container includes one or more caps, valves, lids, covers, plugs, stoppers, doors, or other means known to those of skill to enable enclosing a liquid within the interior volume and also to enable subsequent removal of some or all of the liquid enclosed therein. In embodiments, the interior volume of the container enclosing the liquid includes a headspace volume comprising air.

One or more phosphoester anticorrosion compositions are suitably applied to one or more water sources comprising one or more corrodents to form one or more treated water sources. A treated water source is contacted with a metal containment, wherein corrosion of a surface of the metal containment by the one or more corrodents present in the water source is inhibited. At any point in the storage, conveyance, treatment, discharge, disposal, or any other process in which a water source is contacted with a metal containment surface, about 0.5 ppm to 500 ppm of a phosphoester anticorrosion composition is advantageously applied to the water source to inhibit corrosion of the metal containment surface.

Thus, also disclosed herein is a method of treating a water source comprising one or more corrodents, the method comprising or consisting essentially of applying about 0.5 ppm to 500 ppm by weight or by volume of a phosphoester anticorrosion composition to the water source to form a treated water source, for example about 5 ppm to 500 ppm, or about 10 ppm to 500 ppm, or about 15 ppm to 500 ppm, or about 20 ppm to 500 ppm, or about 25 ppm to 500 ppm, or about 30 ppm to 500 ppm, or about 35 ppm to 500 ppm, or about 40 ppm to 500 ppm, or about 45 ppm to 500 ppm, or about 50 ppm to 500 ppm, or about 60 ppm to 500 ppm, or about 70 ppm to 500 ppm, or about 80 ppm to 500 ppm, or about 90 ppm to 500 ppm, or about 100 ppm to 500 ppm, or about 0.5 ppm to 400 ppm, or about 0.5 ppm to 300 ppm, or about 0.5 ppm to 200 ppm, or about 0.5 ppm to 100 ppm, or about 0.5 ppm to 90 ppm, or about 0.5 ppm to 80 ppm, or about 0.5 ppm to 70 ppm, or about 0.5 ppm to 60 ppm, or about 0.5 ppm to 50 ppm, or about 0.5 ppm to 40 ppm, or about 0.5 ppm to 30 ppm, or about 0.5 ppm to 25 ppm, or about 0.5 ppm to 20 ppm, or about 0.5 ppm to 15 ppm, or about 0.5 ppm to 10 ppm, or about 0.5 ppm to 5 ppm, or about 1 ppm to 100 ppm, or about 5 ppm to 75 ppm, or about 5 ppm to 50 ppm, or about 10 ppm to 50 ppm by weight or by volume of a phosphoester anticorrosion composition by weight to the treated water source.

Also disclosed herein is a method of treating a metal containment, the method comprising or consisting essentially of forming a treated water source; and applying the treated water source to the metal containment. The metal containment is a tank, pipe, or other apparatus having a metal surface in contact with a water source, or potentially in contact with a water source, wherein the water source includes one or more corrodents. In embodiments the one or more corrodents include one or more of hydrogen sulfide, carbon dioxide, oxygen, sodium chloride, calcium chloride, and sulfur dioxide. In embodiments the method includes forming a phosphoester anticorrosion concentrate, then combining the concentrate with the water source. In some such embodiments, the method further includes forming a phosphoester anticorrosion concentrate and storing the concentrate under standard storage conditions for between 1 day and 10 years prior to the adding.

In embodiments, the water source is an industrial water source. In embodiments the water source is a produced water or a connate. In embodiments, the water source is a wastewater from an industrial process. In embodiments the industrial process is papermaking, warewashing, or a mining process. In embodiments the one or more corrodents include $H_2S$. In embodiments, the metal surface or portion thereof in contact with the water source includes a carbon steel. In embodiments, the metal surface or portion thereof in contact with the water source includes a stainless steel. In embodiments, the water source is a continuously flowing water source, such as produced water flowing from a subterranean reservoir and into or through a pipe or tank, or wastewater isolated from a continuous manufacturing process flowing into a wastewater treatment apparatus. In other embodiments, the water source is a batch, or plug, substantially disposed in a batchwise or static state within the metal containment.

Also disclosed herein is a treated water source comprising water, one or more corrodents, and about 0.5 ppm to 500 ppm by weight of the treated water source of a phosphoester anticorrosion composition. In embodiments, the treated water source is disposed within a metal containment and contacted with a surface thereof or portion of a surface thereof.

Also disclosed herein is a treated metal containment comprising a metal containment and a treated water source contacting at least a portion of a metal surface thereof. In embodiments the metal containment is enclosed. In other embodiments the metal containment is exposed to the environment, is in fluid communication with one or more other devices or metal containments, or both exposed to the environment and in fluid communication with one or more other devices or containments. The phosphoester anticorrosion compositions inhibit corrosion of the metal surface or portion thereof of the metal containment contacted by the treated water source.

In embodiments, the phosphoester anticorrosion compositions inhibit corrosion of the metal surface more effectively than a conventional sulfur-based corrosion inhibitor. That is, the phosphoester anticorrosion compositions are more effective, on a weight basis, at inhibiting corrosion than at least one of: 2-mercaptoethanol, thioglycolic acid, and sodium thiosulfate. In embodiments, the phosphoester anticorrosion compositions inhibit corrosion of the metal surface as effectively as 2-mercaptoethanol, on a weight basis. In embodiments, the phosphoester anticorrosion compositions inhibit corrosion of the metal surface more effectively than 2-mercaptoethanol, on a weight basis. In embodiments, the phosphoester anticorrosion compositions inhibit corrosion of the metal surface as effectively as thioglycolic acid, on a weight basis. In embodiments, the phosphoester anticorrosion compositions inhibit corrosion of the metal surface more effectively than thioglycolic acid, on a weight basis. In embodiments, the phosphoester anticorrosion compositions inhibit corrosion of the metal surface as effectively as sodium thiosulfate, on a weight basis. In embodiments, the phosphoester anticorrosion compositions inhibit corrosion of the metal surface more effectively than sodium thiosulfate, on a weight basis.

The metal containment in need of corrosion inhibition is any type of containment comprising one or more metal surfaces for contacting a water source containing one or more corrodents. In some embodiments, the metal containment or a contact surface thereof comprises, consists of, or consists essentially of steel. In some embodiments, the steel comprises, consists of, or consists essentially of carbon steel. In some embodiments, the metal containment or a contact surface thereof comprises, consists of, or consists essentially of iron. In some embodiments, the metal containment or a contact surface thereof comprises or consists essentially of aluminum, zinc, chromium, manganese, nickel, tungsten, molybdenum, titanium, vanadium, cobalt, niobium, copper, or mixtures thereof.

In some embodiments, the metal containment or a contact surface thereof comprises or consists essentially of metal and one or more of boron, phosphorus, sulfur, silicon, oxygen, nitrogen, and/or mixtures thereof. In some embodiments, the metal containment comprises, consists of, or consists essentially of a pipe. In some embodiments, the pipe is coiled tubing. In some embodiments, the pipe has a device attached thereto, the device or a contact surface thereof comprising, consisting of, or consisting essentially of metal. In some embodiments the device is a pressure gauge, a flowmeter, a chemical sensor, or a pump. In some embodiments, the metal containment comprises, consists of, or consists essentially of a tank. In some embodiments, the tank is enclosed and thus the contents of the tank are not open to the atmosphere. In some embodiments, the contents of the enclosed tank are at a pressure that is higher than the ambient environmental air pressure. In some embodiments, the contents of the sealed tank are at a pressure that is lower than the ambient environmental air pressure external to the tank. In some embodiments, the tank is open to the air and the contents are at ambient environmental air pressure. In some embodiments, the tank has an inflow and/or an outflow pipe attached thereto. In some embodiments, the tank has a device attached thereto, such as a pump, flowmeter, chemical sensor, pressure gauge, or metal drill pipe. In some embodiments, the metal containment is a railroad tank car, also known as an "oil can" rail car. In some embodiments, the metal containment is a tank truck, sometimes known as a tanker.

Steel is an alloy comprising, consisting of, or consisting essentially of iron and carbon. Typically, the carbon content of steel is between 0.002% and 2.1% by weight. In some embodiments, the steel comprises between about 0.002% and 2.1% of carbon by weight. In some embodiments, the steel additionally comprises manganese, chromium, nickel, tungsten, molybdenum, boron, titanium, vanadium, cobalt, niobium, phosphorus, sulfur, silicon, oxygen, nitrogen, or copper, or mixtures thereof. In some embodiments, the steel comprises iron sulfide, ferrous oxide (iron (II) oxide), ferric oxide (iron (III) oxide), iron (II, III) oxide, hydrated iron oxides such as $Fe_2O_3 \cdot nH_2O$ where n is a number between 0.1 and 3, $Fe(OH)_3$, and/or $FeO(OH)$. In some embodiments, the steel is pre-corroded and contains, comprises, or has a surface coating comprising rust, oxide, hydroxide, oxide-hydroxide, sulfide, chloride, sulfate, nitrate, carbonate, sulfite, nitrite, phosphate, or mixtures thereof.

Carbon steel is steel in which the main alloying component is carbon, wherein the carbon steel comprises between about 0.1% to about 2.1% by weight of carbon. In one embodiment, the carbon steel comprises between 0.1% and 2.1% by weight of carbon. In one embodiment, the carbon steel comprises between 0.1% and 2.0% by weight of carbon. In one embodiment, the carbon steel comprises between 0.12% and 2.0% by weight of carbon. In one embodiment, the carbon steel comprises between 0.15% and 2.0% by weight of carbon. In one embodiment, the carbon steel comprises between 0.17% and 2.0% by weight of carbon. In one embodiment, the carbon steel comprises between 0.12% and 0.18% by weight of carbon. In one embodiment, the carbon steel comprises between 0.12% and 0.15% by weight of carbon. In one embodiment, the carbon steel comprises 0.18% by weight of carbon.

In embodiments, a method of inhibiting corrosion of a metal containment surface comprises or consists essentially of applying a phosphoester anticorrosion composition to one or more water sources to form a treated water source, and contacting the treated water source with a metal containment surface or portion thereof. In embodiments the applying is applying about 0.5 ppm to 500 ppm of a phosphoester anticorrosion composition to the water source to form a treated water source. In embodiments, the phosphoester anticorrosion composition is applied neat to the water source. In some such embodiments, the method further includes heating the neat phosphoester anticorrosion composition before the applying to the water source to form a treated water source. In embodiments, the phosphoester anticorrosion composition is provided neat and the method further includes dissolving or dispersing the phosphoester anticorrosion composition in water or water mixed with a water-soluble solvent before applying the phosphoester anticorrosion composition to the water source to form the treated water source. In embodiments, the phosphoester anticorrosion composition is provided as a phosphoester anticorrosion concentrate. In embodiments the method includes applying a phosphoester anticorrosion concentrate directly to a metal containment in an amount that results in 0.5 ppm to 500 ppm (by weight or by volume) of the phosphoester anticorrosion composition in the water source. In other embodiments the method further includes diluting a phosphoester anticorrosion concentrate prior to the applying. The diluting comprises, consists essentially of, or consists of combining a phosphoester anticorrosion concentrate with a diluent, wherein the diluent comprises, consists essentially of, or consists of water, a water source, a water soluble solvent, or a mixture of two or more thereof; and optionally includes mixing the phosphoester anticorrosion concentrate with the diluent prior to the applying of the phosphoester anticorrosion composition to the water source to form the treated water source.

In embodiments, the applying a phosphoester anticorrosion composition to a water source comprises, consists essentially of, or consists of dripping, pouring, spraying, pumping, injecting, or otherwise adding a phosphoester anticorrosion composition to the metal containment, or to a water source that subsequently contacts a metal surface or portion thereof in the metal containment. In some embodiments, the applying is batchwise; in other embodiments the applying is continuous. In some such embodiments, the phosphoester anticorrosion composition is heated to a temperature of about 30° C. to 100° C. prior to the applying, wherein the phosphoester anticorrosion composition in the absence or substantial absence of solvents may soften or flow upon heating, thereby allowing its application to the metal containment, or to the water source that subsequently contacts a metal surface or portion thereof in the metal containment.

In embodiments, the water source is selected from the group consisting of produced water, injectate, effluent from mining, and effluent from paper production. In embodiments, the water source is a high total dissolved solids water source; a high temperature water source; or a high total dissolved solids, high temperature water source. As used herein, "high temperature" means temperature in excess of about 60° C. and as high as about 200° C. As used herein, "high total dissolved solids" means about 5 wt % or more non-polymeric solids are dissolved in the water source. In some embodiments where the water source includes high total dissolved solids, a substantial portion of the total dissolved solids (that is, more than 50% by weight) are ionic compounds. High total dissolved solids water sources include about 5 wt % to 35 wt %, or about 5 wt % to 32 wt %, or about 5 wt % to 30 wt %, or about 5 wt % to 28 wt %, or about 5 wt % to 26 wt %, or about 5 wt % to 24 wt %, or about 5 wt % to 22 wt %, or about 5 wt % to 20 wt %, or about 6 wt % to 35 wt %, or about 7 wt % to 35 wt %, or about 8 wt % to 35 wt %, or about 9 wt % to 35 wt %, or about 10 wt % to 35 wt %, or about 12 wt % to 35 wt %, or about 14 wt % to 35 wt %, or about 16 wt % to 35 wt %, or about 18 wt % to 35 wt %, or about 20 wt % to 35 wt %, or about 22 wt % to 35 wt %, or about 25 wt % to 35 wt %, or about 10 wt % to 32 wt %, or about 10 wt % to 30 wt %, or about 10 wt % to 28 wt %, or about 10 wt % to 26 wt %, or about 10 wt % to 24 wt %, or about 10 wt % to 22 wt %, or about 10 wt % to 20 wt % non-polymeric solids. In some embodiments, the non-polymeric solids are corrodents. In some embodiments, the non-polymeric solids comprise corrodents. In some embodiments, the water source is produced water, brackish water, or sea water.

In some embodiments, the water source comprises, consists essentially of, or consists of produced water, injectate, seawater, municipal water, wastewater such as runoff water, "gray" water, municipal waste water, treated or partially treated waste water, brackish water, sea water, connate, groundwater, wastewater discharge from a pulp or paper mill, waste from mining such as "tailings", red mud from aluminum mining and processing, yellow boy, acid mine drainage, or a combination of two or more such water sources as determined by context. In some embodiments, the water source comprises 85000 ppm Cl or more. In some embodiments, the water source comprises from 300 to 18000 ppm by weight of Cl. In some embodiments, the water source comprises between 10000 and 100000 ppm of Cl. In some embodiments, the water source comprises between 50000 and 200000 ppm based on weight.

In some embodiments, the water source comprises water and one or more corrodents, wherein the one or more corrodents comprises, consists essentially of, or consists of metal cations, metal complexes such as aqueous metal cations, metal chelates and/or organometallic complexes, aluminum ions, ammonium ions, barium ions, chromium ions, cobalt ions, cuprous ions, cupric ions, calcium ions, ferrous ions, ferric ions, hydrogen ions, magnesium ions, manganese ions, molybdenum ions, nickel ions, potassium ions, sodium ions, strontium ions, titanium ions, uranium ions, vanadium ions, zinc ions, bromide ions, carbonate ions, chlorate ions, chloride ions, chlorite ions, dithionate ions, fluoride ions, hypochlorite ions, iodide ions, nitrate ions, nitrite ions, oxide ions, perchlorate ions, peroxide ions, phosphate ions, phosphite ions, sulfate ions, sulfide ions, sulfite ions, hydrogen carbonate ions, hydrogen phosphate ions, hydrogen phosphite ions, hydrogen sulfate ions, hydrogen sulfite ions, carbonic acid, hydrochloric acid, nitric acid, sulfuric acid, nitrous acid, sulfurous acid, peroxy acids, phosphoric acid, ammonia, bromine, carbon dioxide, chlorine, chlorine dioxide, fluorine, hydrogen chloride, hydrogen sulfide, iodine, nitrogen dioxide, nitrogen monoxide, oxygen, ozone, sulfur dioxide, hydrogen peroxide, polysaccharide, or combinations thereof.

In some embodiments, the one or more corrodents comprises, consists of, or consists essentially of insoluble particulates such as metal oxides, sands, clays, silicon dioxide, titanium dioxide, muds, and other insoluble inorganic and/or organic particulates, which in some embodiments act as abrasives when entrained in a water flow contacting a metal.

In some embodiments, the one or more corrodents comprises, consists of, or consists essentially of an oxidizing agent. In some embodiments, the corrodent comprises, consists of, or consists essentially of a chelating agent. In some embodiments, the corrodent comprises an alcohol. In some embodiments, the corrodent comprises an organochlorine compound. In some embodiments, the one or more corrodents comprises, consists of, or consists essentially of an acid. In some embodiments, the one or more corrodents comprises, consists of, or consists essentially of an alkali.

In some embodiments, the pH of the water source is less than 7. In some embodiments, the pH of the water source is between about 1 and about 6. In some embodiments, the pH of the water source is between 5 and 6. In some embodiments, the pH of the water source is between 4 and 5. In some embodiments, the pH of the water source is between 3 and 4. In some embodiments, the pH of the water source is between 2 and 3. In some embodiments, the pH of the water source is between 1 and 2. In some embodiments, the pH of the water source is between 0 and 1. In some embodiments, the pH of the water source is between 7 and 14. In some embodiments, the pH of the water source is between 8 and 14. In some embodiments, the pH of the water source is between 9 and 14. In some embodiments, the pH of the water source is between 10 and 14. In some embodiments, the pH of the water source is between 11 and 14. In some embodiments, the pH of the water source is between 12 and 14. In some embodiments, the pH of the water source is between 13 and 14. In some embodiments, the pH of the water source is between 7 and 8. In some embodiments, the pH of the water source is between 7 and 9. In some embodiments, the pH of the water source is between 7 and 10. In some embodiments, the pH of the water source is between 7 and 11. In some embodiments, the pH of the water source is between 7 and 12. In some embodiments, the pH of the water source is between 7 and 13. In some embodiments, the pH of the water source is between 8 and 13. In some embodiments, the pH of the water source is between 9 and 12. In some embodiments, the pH of the water source is between 10 and 11.

In some embodiments, the water source comprises, consists essentially of, or consists of produced water; injectate; connate; industrial wastewater; an aqueous mixture comprising sodium hydroxide and sodium sulfide ("white liquor"); an aqueous mixture comprising lignin, one or more carbohydrates, sodium carbonate, sodium sulfate, and/or one or more other salts ("black liquor"); municipal waste water, treated or partially treated waste water; sea water; or a combination of two or more such water sources as determined by context. In some embodiments, the water source includes one or more salts, ions, buffers, acids, bases, surfactants, or other dissolved, dispersed, or emulsified compounds, materials, components, or combinations thereof. In some embodiments, a water source includes about 0 wt % to 35 wt % total dissolved solids. In some such embodiments, the total dissolved solids are substantially non-polymeric solids. In some such embodiments, the dissolved solids comprise, consist of, or consist essentially of ionic compounds. In some embodiments, the water source to which the corrosion inhibitor is applied to produce the corrosion inhibitor composition is sea water, brackish water, produced water, one or more additional water sources, or combinations thereof. In some such embodiments, the additional water source includes 300 ppm or more of one or more ions. In some embodiments, the water source for the corrosion inhibitor composition contains one more of the following: about 300 ppm or more of Ca, for example 500 ppm or more or even 3000 ppm or more of Ca; about 1100 ppm or more of Mg; about 300 ppm or more of Ba, for example about 500 ppm or more of Ba.

In some embodiments, the water source comprises, consists of, or consists essentially of brackish water. In some embodiments, the water source comprises, consists of, or consists essentially of seawater. In some embodiments, the water source comprises, consists of, or consists essentially of produced water. In some embodiments, the water source comprises 100 to 20000 ppm of Cl, based on weight. In some embodiments, the water source comprises 20000 to 25000 ppm of Cl, based on weight. In some embodiments, the water source comprises 10000 to 100000 ppm of Cl, based on weight. In some embodiments, the water source comprises 25000 to 200000 ppm of Cl, based on weight. In embodiments, the Cl is present as chloride ions. Useful water sources for the invention comprise, consist of, or consist essentially of produced water, injectate, or mixtures thereof.

In embodiments, the water source includes one or more salts, polymers, surfactants, scale inhibitors, stabilizers, metal chelating agents, corrosion inhibitors, paraffin inhibitors, and other additives as determined by the operator in a subterranean hydrocarbon recovery process or another industrial process. In some embodiments, the water source comprises, consists of, or consists essentially of injectate, connate, produced water, sea water, brackish water, or brine. In some embodiments, an injectate comprises one or more of connate, produced water, sea water, brackish water, or brine. In embodiments where an injectate comprises produced water, the injectate is also termed "recycled produced water." In some embodiments, the water source further comprises minor (<50 wt %) amounts of residual hydrocarbon products entrained therein and additionally. In some embodiments, produced water additionally comprises one or more surfactants, solvents, coupling agents, emulsifying agents (emulsifiers), demulsifying agents (demulsifiers), paraffin wax inhibitors, and mixtures of two or more thereof.

A water source comprising a sufficient concentration of corrodents such that the untreated water source corrodes carbon steel at a rate of about 500 milli-inches per year (mpy), exhibits a reduced rate of corrosion when 5 ppm by volume of a conventional sulfur-based corrosion inhibitor is applied thereto, for example a 50% to 60% reduction in corrosion rate (thus, to about 200 mpy to 250 mpy) when 5 ppm by volume of thioglycolic acid is applied to the water source. However, a phosphoester anticorrosion composition applied to the same water source at 5 ppm by volume results in at least a 70% reduction in the rate of corrosion, for example 70% to 99% reduction in the rate of corrosion, or about 70% to 98%, about 75% to 98%, about 80% to 98%, about 85% to 98%, about 90% to 98%, about 70% to 95%, about 70% to 90%, about 70% to 85%, or about 70% to 80% reduction in the rate of corrosion. In embodiments, the reduced rate of corrosion of a carbon steel is a rate of less than about 150 mpy and in some embodiments as low as 10 mpy, such as 10 mpy to 150 mpy, 10 mpy to 140 mpy, 10 mpy to 130 mpy, 10 mpy to 120 mpy, 10 mpy to 110 mpy, 10 mpy to 100 mpy, 10 mpy to 90 mpy, 10 mpy to 80 mpy, 10 mpy to 70 mpy, 10 mpy to 60 mpy, 10 mpy to 50 mpy, 10 mpy to 40 mpy, 10 mpy to 30 mpy, 20 mpy to 100 mpy, 30 mpy to 100 mpy, 40 mpy to 100 mpy, 50 mpy to 150 mpy, 60 mpy to 150 mpy, 70 mpy to 150 mpy, 80 mpy to 150 mpy, or 90 mpy to 150 mpy.

For example, when added to produced water at 5 ppm by volume, a phosphoester anticorrosion composition is more effective than thioglycolic acid at inhibiting corrosion of a carbon steel surface. In embodiments, the phosphoester anticorrosion compositions reduce corrosion 50% to 200% more than the same weight of thioglycolic acid in the same water source and over the same period of time, for example about 100% to 400%, or about 100% to 300%, or about 100% to 200%, or about 100% to 500%, or about 100% to 400%, or about 100% to 300%, or about 100% to 200% more than the same weight of thioglycolic acid in the same water source and over the same period of time. In embodiments the period of time is at least 2 hours, at least 4 hours, or at least 8 hours. In embodiments the period of time is up to 10 years.

The experimental results below establish that the phosphoester anticorrosion compositions are more effective in inhibiting corrosion of carbon steel contacted with corrodent-bearing water sources than sulfur-based corrosion inhibitors, based on mass of corrosion inhibitor applied to a water source. Conventional sulfur-based corrosion inhibitors include 2-mercaptoethanol, thioglycol, and sodium thiosulfate. Further, the phosphoester anticorrosion compositions do not degrade to form $H_2S$ during storage, as do conventional sulfur-based corrosion inhibitors. This is a benefit in and of itself due to the toxicity of $H_2S$ gas and the fact that $H_2S$ is also a corrodent. Further, after a period of storage of a concentrate under standard storage conditions, e.g. a concentrate of thioglycolic acid or 2-mercaptoethanol vs. a phosphoester anticorrosion concentrate, more corrosion inhibiting compound is present in a container including the phosphoester anticorrosion concentrate than is present in a conventional sulfur-based corrosion inhibitor stored at the same concentration and for the same period of time and under the same storage conditions.

Even further, a phosphoester anticorrosion composition may be stored neat, that is, in the absence or substantial absence of solvents. Neat storage reduces the volume required to store the phosphoester anticorrosion compositions compared to compositions including one or more solvents. In embodiments, the neat phosphoester anticorrosion compositions are stable under non-standard storage conditions. In embodiments, the neat phosphoester anticorrosion compositions are stable under standard storage conditions but for longer periods of time than a conventional sulfur-based corrosion inhibitor in a concentrate. For all the foregoing reasons, the phosphoester anticorrosion compositions are more effective in inhibiting corrosion than conventional sulfur-based corrosion inhibitors, including 2-mercaptoethanol, thioglycol, and/or sodium thiosulfate.

Having described the invention in detail, it will be apparent that modifications and variations are possible without departing from the scope of the invention defined in the appended claims.

EXPERIMENTAL

Example 1

A 250 mL roundbottom flask was charged with 174.0 g (0.25 mol) of a phosphate alkylphenol ethoxylate ester (mixture of monoester and diester) having an average of 9 ethoxy groups, and an average molecular weight determined to be 696 g/mol by hydroxyl number and the contents of the flask were warmed to 100° C. Then 35.05 g HMTA (0.25 mol), a solid powder, was added to the flask with stirring and the contents of the flask were maintained at 100° C.-110° C. with stirring for another two hours. Then the heat source was disconnected and the contents of the flask, referred to as Adduct 1 herein, was poured out while still hot. Adduct 1 was observed to be opaque and flowable but highly viscous during the pouring. Adduct 1 was dissolved in methanol to form a 20 wt % solution.

Example 2

Adduct 1 was subjected to corrosion inhibition testing using corrosion bubble cell tests. The bubble cell tests were performed using the general procedure set forth in Andreev, N. et al., *J. Corros. Scale Inhib.* 2013, 2(1), 17-19. Conditions used were C1018 carbon steel electrode; 80° C.; $CO_2$ saturated 3% NaCl in water; continuous $CO_2$ sparge; and atmospheric pressure. The brine was allowed to contact the C1018 carbon steel electrode for about 3 hours; then the test was started by adding 5 ppm by volume of a test material (delivered from the methanol solution) to the test vessel.

Corrosion inhibition results are expressed as milli-inches of steel lost (via corrosion) per year, or mpy, as a function of time. The test was carried out by applying an amount of Adduct 1 to the brine in the test vessel to result in 5 ppm by volume of Adduct 1 in the brine. The test was repeated with 5 ppm by volume of thioglycolic acid (TGA), a conventional sulfur-containing corrosion inhibitor widely used in the industry. Finally, the test was repeated with no corrosion inhibitor added (Blank). The FIGURE shows the comparison of corrosion rate of the Blank with brine containing 5 ppm by volume Adduct 1 as well as the brine containing 5 ppm TGA by volume.

The FIGURE shows that the corrosion rate in the uninhibited test was reduced from about 240 mpy to about 70 mpy using Adduct 1; that is, Adduct 1 provided 70% corrosion inhibition. The corrosion rate in the test employing thioglycolic acid (TGA) was reduced from about 230 mpy to about 120 mpy; that is, TGA provided 48% corrosion inhibition.

What is claimed:
1. A phosphoester anticorrosion composition comprising an adduct of an alkylphenol ethoxylate phosphate ester with 1,3,5,7-tetraazaadamantane, wherein the alkylphenol ethoxylate phosphate ester comprises one or more structures corresponding to formula I, formula II, or a combination thereof,

I

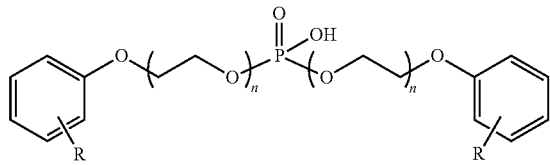

II

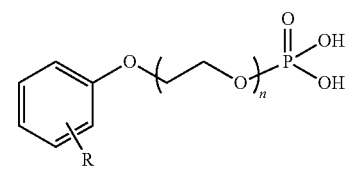

wherein each n is independently an integer having a value of between 4 and 20, and each R is independently a C6-C20 linear or branched alkyl.

2. The phosphoester anticorrosion composition of claim 1 wherein the alkylphenol ethoxylate phosphate ester is a mixture of formula I and formula II.

3. The phosphoester anticorrosion composition of claim 1 wherein each R is a C9 linear or branched alkyl.

4. The phosphoester anticorrosion composition of claim 1 wherein the molar ratio of alkylphenol ethoxylate phosphate ester to 1,3,5,7-tetraazaadamantane in the composition is about 1:1.

5. The phosphoester anticorrosion composition of claim 1 further comprising a solvent, wherein the solvent is present in the composition at about 10 wt % to 99 wt %.

6. The phosphoester anticorrosion composition of claim 5 wherein the solvent is selected from water, $C_1$-$C_6$ alkanols, alkoxyalkanols, glycols, glycol ethers, glycol esters and mixtures thereof.

7. A method of making a phosphoester anticorrosion composition, the method comprising:
  forming an adduct by combining a alkylphenol ethoxylate phosphate ester with 1,3,5,7-tetraazaadamantane, wherein the alkylphenol ethoxylate phosphate ester comprises one or more structures corresponding to formula I, formula II, or a combination thereof

I

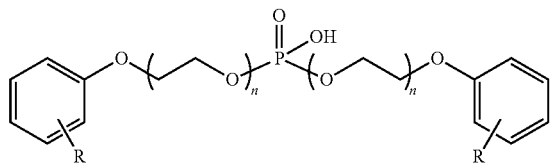

II

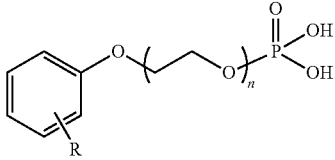

wherein each n is independently an integer having a value of between 4 and 20, and each R is independently a linear or branched C6-C20 alkyl; and
  heating the combination.

8. The method of claim 7 wherein the combining is combining about 1 mole of alkylphenol ethoxylate phosphate ester with about 1 mole of 1,3,5,7-tetraazaadamantane.

9. The method of claim 7 wherein the heating is to a temperature of about 80° C. to 200° C.

10. A treated water source comprising:
  a water source comprising one or more corrodents; and
  about 0.5 ppm to 500 ppm by volume of the adduct of claim 1.

11. The treated water source of claim 10 wherein the one or more corrodents comprise hydrogen sulfide, carbon dioxide, oxygen, sodium chloride, calcium chloride, sulfur dioxide, or a mixture of two or more thereof.

12. A method of treating a metal containment, the method comprising:
  combining about 0.5 ppm to 500 ppm by volume of the adduct of claim 1 to a water source comprising one or more corrodents to form a treated water source; and
  applying the treated water source to the metal containment.

13. The method of claim 12 wherein the method further comprises forming a mixture of the adduct with a solvent prior to the combining, and storing the mixture for 1 day to 10 years after forming and prior to the combining.

14. A treated metal containment comprising:
  a metal containment comprising a metal surface; and
  the treated water source of claim 10,
wherein at least a portion of the metal surface is contacted by the treated water source.

15. The treated metal containment of claim 14 wherein the metal containment is a tank or pipe.

16. The treated metal containment of claim 14 wherein the metal surface comprises carbon steel.

* * * * *